A. FELTMAN.
AMUSEMENT RIDING DEVICE.
APPLICATION FILED AUG. 28, 1918.

1,293,393.

Patented Feb. 4, 1919.
3 SHEETS—SHEET 1.

WITNESSES

INVENTOR
A. FELTMAN
BY
ATTORNEYS

A. FELTMAN.
AMUSEMENT RIDING DEVICE.
APPLICATION FILED AUG. 28, 1918.
1,293,393.
Patented Feb. 4, 1919.
3 SHEETS—SHEET 2.
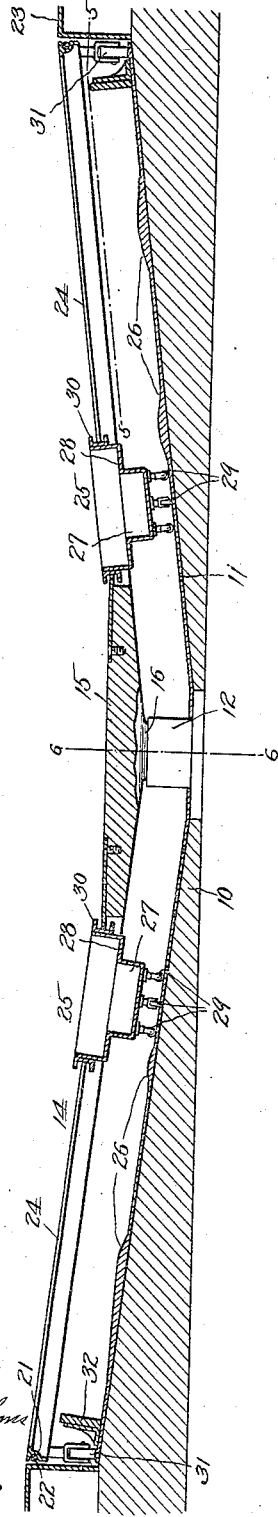
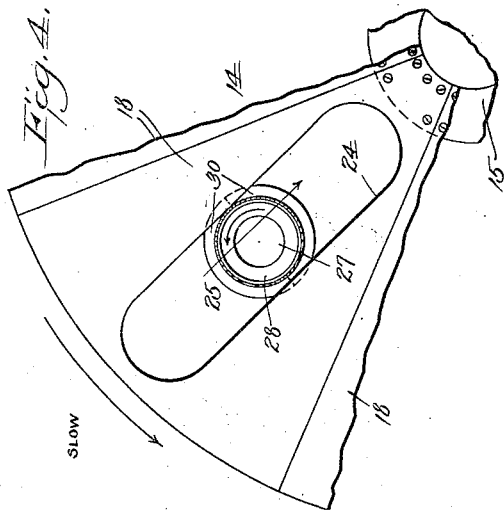
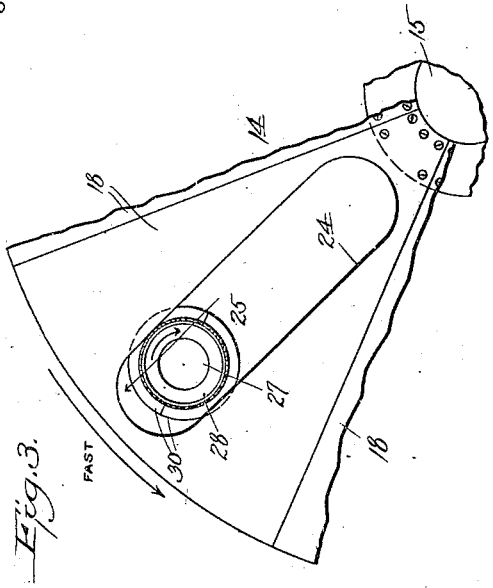
WITNESSES
INVENTOR
A. FELTMAN
BY
ATTORNEYS A. FELTMAN.
AMUSEMENT RIDING DEVICE.
APPLICATION FILED AUG. 28, 1918.
1,293,393.
Patented Feb. 4, 1919.
3 SHEETS—SHEET 3.
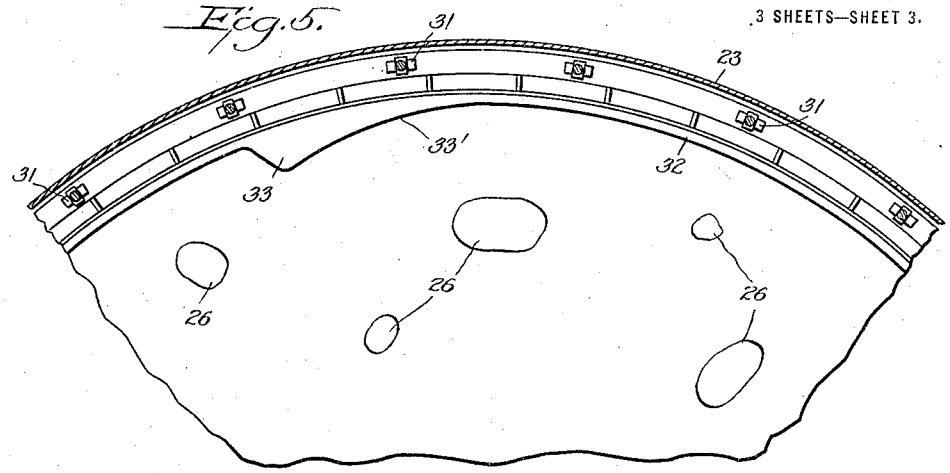
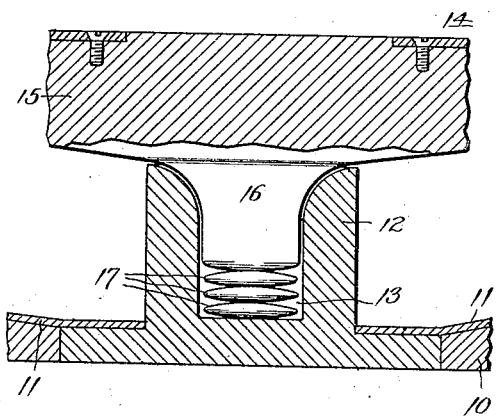
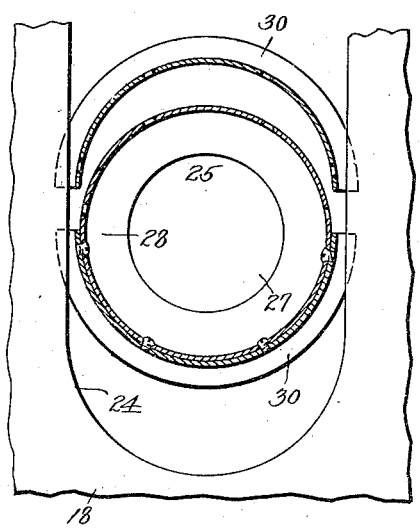
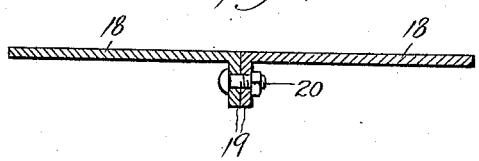
WITNESSES
INVENTOR
A. FELTMAN
BY
ATTORNEYS

UNITED STATES PATENT OFFICE.

ALFRED FELTMAN, OF BROOKLYN, NEW YORK.

AMUSEMENT RIDING DEVICE.

1,293,393. Specification of Letters Patent. Patented Feb. 4, 1919.

Application filed August 28, 1918. Serial No. 251,798.

*To all whom it may concern:*

Be it known that I, ALFRED FELTMAN, a citizen of the United States, and a resident of the city of New York, Coney Island, borough of Brooklyn, in the county of Kings and State of New York, have invented a new and Improved Amusement Riding Device, of which the following is a full, clear, and exact description.

This invention relates to pleasure apparatus and has particular reference to amusement devices of the general nature of carousels or merry-go-rounds, and has particular reference to a device of this character in or upon which a number of persons may be carried through any regular or serpentine path around the center of the apparatus.

Among the several objects of the invention is to provide an apparatus of the character indicated comprising a platform rotatable by any suitable power means around a vertical axis on or over a stationary base, means being provided to insure absolute safety to the passengers and yet with ample provision for the greatest amount of amusement and exhilaration.

A further object of the invention is the provision of an amusement device of a stationary base having a plurality of bumps or projections and over which base there is rotated a disk like carrier around the vertical axis and having a plurality of independent cars which are conveyed along their variable paths according to the speed of rotation so as to engage more or less of said bumps or projections.

A still further object is to provide an amusement device comprising a stationary base, a disk-like carrier rotatable thereover around a vertical axis, and a series of independent cars actuated by the carrier and caused to move outward radially over the base as the speed of the carrier increases or inward when the speed is reduced, auxiliary means being provided in connection with the base to give the cars an inward impulse from time to time.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 2 is a vertical transverse section of the same on the line 2—2 Fig. 1.

Figs. 3 and 4 are detail views indicating the relative movements and positions of the cars with respect to the carrier when running fast or slow respectively.

Fig. 5 is a horizontal section on the line 5—5 of Fig. 2.

Fig. 6 is a vertical section on the line 6—6 of Fig. 2.

Fig. 7 is a vertical sectional detail on the line 7—7 of Fig. 1, and

Fig. 8 is a large sectional detail of one of the cars on about the plane of the carrier and indicating the manner of assembling the parts.

Figure 1:
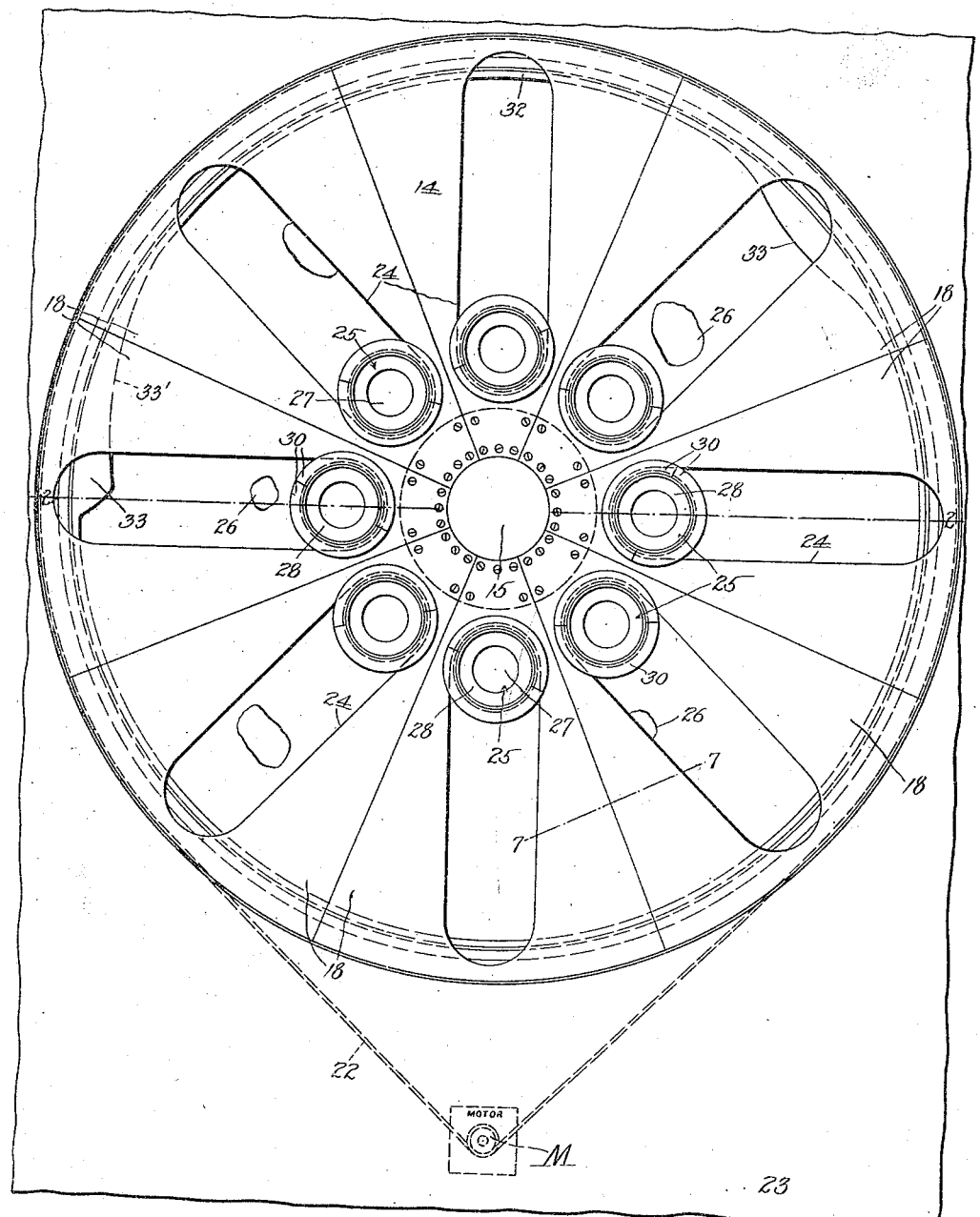
Figure 1 is a plan view in diagram of my improvement while stationary.

Referring now more specifically to the drawings I show at 10 any suitable stationary and substantial base having a generally horizontal disposition, but depressed somewhat at the center in the form of a flat inverted cone. The surface of the base is covered with a track member 11 of sheet metal or the like forming a rail surface for the movable parts above it. At the center of the base is arranged a cup-like pedestal 12 having a central cavity 13.

14 indicates a hollow rotatable carrier in the nature of a turn-table having a hub portion 15 with a step bearing 16 projecting into the depression 13 and coöperating with a plurality of relatively movable bearing disks 17. The pedestal and step bearing device constitute a means to prevent lateral or radial movement of the carrier while providing for relatively free rotation thereof around the vertical central axis of said bearing.

As shown in Figs. 1 and 7 the carrier is constructed mainly of sector shaped plates 18 of sheet metal or the like adapted to be rigidly and strongly united each to each along radial joints 19, as indicated in detail in Fig. 7. Any suitable means 20, such as bolts or rivets may be employed for this purpose. The inner ends of these plates 18 may be secured to the hub 15 by means of screws, bolts, rivets or the like adapting the device to be taken apart if desired. The periphery of the carrier carries or is formed into a channel or groove 21 for a driving belt 22 of any suitable shape or construction whereby the carrier may be rotated at any desired speed under the control of the operator from a motor M located beneath or at one side of a platform 23 surrounding the movable parts of the structure.

The carrier is provided with any suitable number or form of open slots 24 shown in the drawings as straight and radially disposed, and one for each plate 18. The side edges of each slot are parallel and the ends are semi-circular. These edges are smooth and the plates are of sufficient stiffness and strength for the edges of the slots to act as guiding and propelling means for a plurality of independent cars 25, one being arranged in each slot. The slotted portions of the carrier are inclined outwardly from the hub 15 and are approximately parallel to the track member 11 of the base, to avoid the bumps or projections 26 above referred to.

Attention is now drawn to the construction of each car 25. This comprises a body 27 having an annular seat 28 in or upon which a considerable number of passengers may be seated facing toward the center of the car. The body and seat structure fits loosely within the slot 24 and is supported through a plurality of casters 29 with anti-friction rollers upon the track member 11 and upon which the car will gravitate toward the inner end of the slot when the carrier is at rest or running at low speed. A two-part guard rail 30, of channel-form in cross section, is secured to the largest portion of the car body. The flanges of the guard rail project far enough radially to extend over and beneath the rim of the slot 24. The vertical distance between the flanges is sufficient to afford such vertical vibration of the car as is incident to the operation thereof over the bumps 26. When the guard rail is secured to the car it is impossible for the car to leave the slot 24 and hence injury to the passengers is practically impossible while seated in the car. When one or the other of the segments of the guard rail is loosened or detached from the car as indicated in Fig. 8, it is obvious that the car may be readily slipped in or out of the slot, a feature of importance in respect to the transportation or assemblage of the apparatus.

The periphery of the carrier is provided with any suitable number, arrangement or design of anti-friction supports 31 which roll either upon the periphery of the track member 11 or any suitable track provided therefor auxiliary to the track member.

Arranged within the path of the rollers 31 is a stationary rail or barrier 32 of a generally circular form and concentric with the carrier. As shown in Fig. 5, however, this barrier may include one or more inwardly projecting cams or deflectors 33, the approach to which may be either gradual or abrupt according to the desire of the designer of the apparatus, but as indicated in Fig. 5 the approach is relatively gradual as indicated at 33'.

The operation of the amusement device may be briefly summarized as follows: With the parts in stationary position as shown in Fig. 1 the passengers or pleasure seekers pass from the platform 23 from any desired direction directly upon the carrier and thence take their seats in the cars 25, when all are ready the operator in control of the motor starts the operation of the machine in a direction indicated in the drawings as counter-clockwise. Thus, though the cars are supported upon the stationary base and track member 11 they are carried circumferentially around the vertical center of the machine by contact of the rear edges of the slots 24 against the guard rail portions of the cars. Combined with this circumferential movement is the outward radial movement along the slots due to the increasing speed of rotation of the carrier. This outward movement immediately causes rotation of the cars around their axes as a result of the centrifugal force due to the rotation of the carrier and whereby the cars are caused to ride upwardly as well as outward, the several directions of movement at this stage being indicated by the several arrows on Fig. 3. Any of the bumps 26 that may be encountered during this movement of the cars over the base may naturally cause an upward impulse upon the cars depending upon the form or elevation of said bumps and the speed at which the cars are moving thereover. At maximum speed the cars will be checked at the outer ends of the slots 24 or by a contact between the body of the cars and the rail 32. When one of the deflectors 33 is struck by the cars at their outermost position said cars will be given an inward and downward impulse toward the center of the carrier, the extent of which impulse will be in accordance with the speed of the carrier and the abruptness of the deflectors. When the speed is lowered the cars will gravitate toward the center of the carrier and dragging or rolling against the rear edges of the slot will be given thereby a rotation in a reverse direction as indicated in Fig. 4.

I claim:

1. The herein described amusement riding device comprising a stationary base having thereon a track member, a stationary rail constituting a barrier supported upon the circumferential margin of said track member concentric with the base, a carrier mounted to rotate around the central axis of the base, said carrier being provided with a circular series of radial slots extending from the central portion thereof outward adjacent to and over said barrier, said carrier being otherwise substantially smooth and imperforate and over which passengers may walk freely, a car located in each of said slots and supported anti-frictionally upon said track member, said car having circular flange members overlapping the edges of the slot serving to prevent upward displacement of the car therefrom, and means to cause the rotation of the carrier at varying speeds so as to cause the cars to move circumferentially with the carrier and also radially along the slots until limited in their outward movement by said barrier.

2. In an amusement riding device, the combination of a base, a circular carrier supported centrally upon the base, means to cause relative rotation between the carrier and the base, said carrier being provided with a series of radial slots, but being otherwise substantially imperforate providing for the passengers to walk thereover, a plurality of cars located in the several slots and supported movably upon the base, each slot having parallel side edges, each car being provided with a circumferential guard rail of channel form in cross section into which both of said slot edges project and have constant interlocking engagement to prevent excessive tilting of the car with respect to the carrier, and means to cause the relative rotation aforesaid between the carrier and the base whereby the several cars will be caused to move along the several slots and caused to rotate around their own axes by contact between said guard rails and the edges of the slots.

3. In an amusement riding device, the combination of a base, a circular carrier pivoted centrally with respect to the base, means to cause relative rotation between the carrier and the base at any desired speed, said carrier having a plurality of radial slots, each slot having parallel side edges and equal semi-circular ends, and a plurality of circular cars arranged in the several slots and movable radially along the slots while being supported upon the base, each car comprising a two-part guard rail of channel form in cross section loosely embracing the edges of the slot in which such car is located, whereby the car is held from undue tilting with respect to the carrier but said rail being separable to permit the removal of the car from the slot when desired.

4. The combination of a stationary base having an outwardly and upwardly inclined track surface and a central step bearing member, a carrier having a step bearing member coöperating with the base member, means to rotate the carrier at variable speeds around the axis of the bearing and over the inclined track member, a plurality of independent cars supported anti-frictionally upon the track member and coöperating with the carrier whereby the rotation thereof will cause a revolution of the cars around the step bearing members aforesaid at varying distances from the step bearing according to the speed of the carrier, and auxiliary means acting upon the cars tending to pitch the same out of their regular course.

5. In a device of the character set forth the combination of a stationary base having a track member thereon, a plurality of variously shaped and placed deflectors supported upon the base, a carrier pivoted upon the base, means to rotate the carrier around the pivot at variable speeds, said carrier including a series of radial slots, and a plurality of independent passenger carrying cars arranged in the several slots and supported directly upon the base whereby the rotation of the carrier will cause the revolution of the cars around the pivot aforesaid and rotation of the cars around their own axes in variable directions in accordance with the variation of the speed of the carrier and contact with said deflectors.

ALFRED FELTMAN.

Copies of this patent may be obtained for five cents each, by addressing the "Commissioner of Patents Washington, D. C."